N. M. LOWER.
LOCOMOTIVE STOKER.
APPLICATION FILED OCT. 16, 1912.

1,368,271. Patented Feb. 15, 1921.
5 SHEETS—SHEET 4.

WITNESSES INVENTOR

N. M. LOWER.
LOCOMOTIVE STOKER.
APPLICATION FILED OCT. 16, 1912.

1,368,271.

Patented Feb. 15, 1921.
5 SHEETS—SHEET 5.

WITNESSES
W. T. Holman
Elbert L. Hyde

INVENTOR
Nathan M. Lower
By Fred'k H. Winter
his attorney

UNITED STATES PATENT OFFICE.

NATHAN MARPLE LOWER, OF JARRETTOWN, PENNSYLVANIA, ASSIGNOR TO LOCOMOTIVE STOKER COMPANY, OF SCHENECTADY, NEW YORK, A CORPORATION OF PENNSYLVANIA.

LOCOMOTIVE-STOKER.

1,368,271.  Specification of Letters Patent.  Patented Feb. 15, 1921.

Application filed October 16, 1912. Serial No. 726,108.

*To all whom it may concern:*

Be it known that I, NATHAN MARPLE LOWER, a resident of Jarrettown, in the county of Montgomery and State of Pennsylvania, have invented a new and useful Improvement in Locomotive-Stokers, of which the following is a specification.

The invention relates to locomotive stokers. One of the objects of the invention is to provide new and improved mechanism for automatically transferring fuel from the tender to the locomotive fire box, separating the fine from the coarse fuel and simultaneously underfeeding the fine fuel and overfeeding the coarse fuel into the fire box.

A further object is to provide improved means for distributing fuel throughout substantially the entire extent of the fuel bed and for varying the amount of fuel fed to different parts of the fire, to thereby promote economy in consumption of fuel and secure a fire giving maximum heat efficiency.

A further object is to provide improved means for feeding the coarse fuel into the fire box and scattering the same over the fuel bed, said means comprising plungers arranged to throw the fuel into the fire box with successive light and heavy impulses, to enable the fuel to be delivered either at the front or back of the fuel bed.

Another object is to provide improved means arranged to coöperate with said plungers and throw the fuel laterally to one side or the other to thereby deliver it to the sides and back corners of the fuel bed as efficiently as to other portions thereof.

A further object is to provide in combination with automatic stoker mechanism embodying a conveying tube, a mechanically operated screen for separating the coarse from the fine fuel, to thereby enable fuel to be respectively overfed and underfed, as heretofore stated.

A further object is to provide an improved crushing mechanism for breaking up the fuel and reducing the size of the lumps or masses thereof and delivering the same to the fuel feeding mechanism, said crusher mechanism being adjustable to permit the passage therethrough of abnormally large masses either of fuel or of foreign matter such as might damage the crusher, and permit the discharge thereof from the mechanism. Other objects and advantages of the invention will appear from the following specification.

Figures 1, 4, 5:
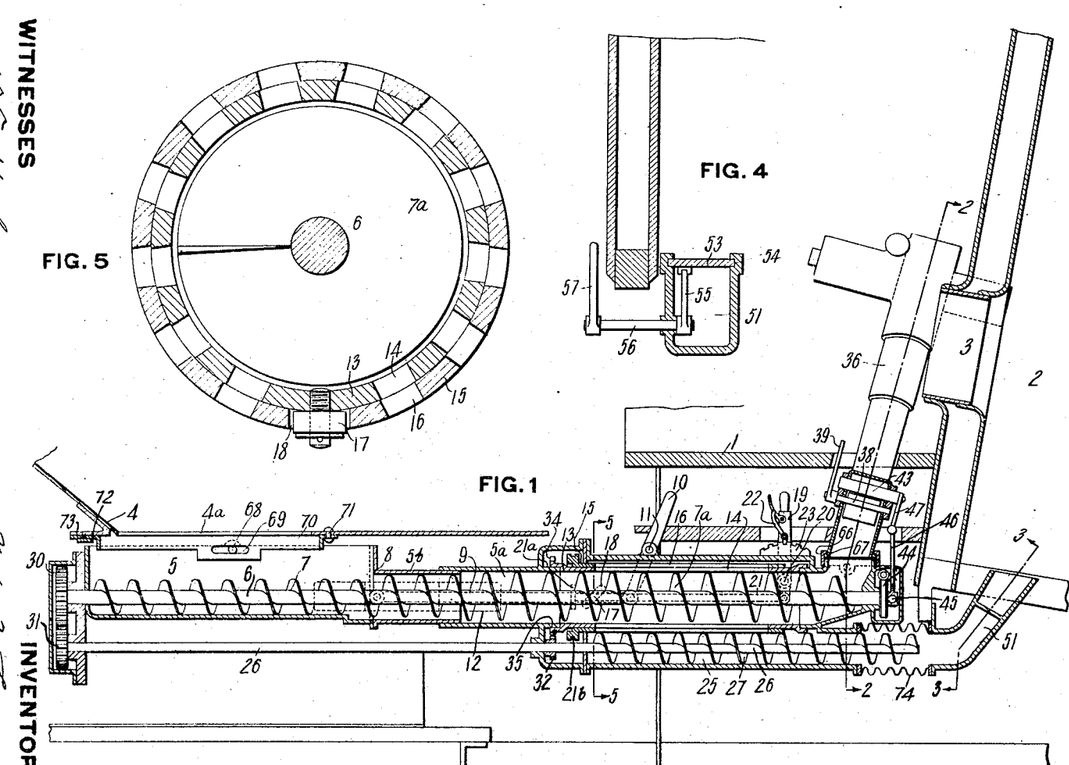
Figure 1 represents a longitudinal section through a stoker mechanism constructed according to my invention, the locomotive and tender to which the same is applied being shown somewhat conventionally.
Fig. 4 is a longitudinal section on the line 4—4, Fig. 3.
Fig. 5 is an enlarged transverse section, taken on the line 5—5, Fig. 1, and showing the fuel separating screen.

The stoker is shown in Fig. 1 as applied to the rear of a locomotive having a deck 1 and a fire box 2, the latter being provided with the usual fire-door opening 3. Connected behind the locomotive is the usual tender 4 which carries fuel to be supplied to the fire box. The fuel carried by the tender may be either the ordinary run of mine or it may be fuel especially prepared before being supplied to the tender, but in any case it generally composes both fine and coarse particles.

The fuel in the tender passes by gravity through an opening 4ª in the bottom of the tender to a conduit 5 in which rotates a shaft 6 carrying spiral vanes forming a screw conveyer 7 which is power operated, as will be hereinafter described, and which conveys the fuel longitudinally in the trough and carries it forward toward the engine through an enlarged section 5ª of the conduit. The portion of the screw conveyer within the enlarged section 5ª is also of large size to fit the enlarged section. This construction prevents the screw conveyer from being clogged, since its capacity is increased beyond the point of fuel supply.

The screw conveyer also acts in part as a fuel crusher. Any large lumps or masses of fuel or foreign material are caught by a shoulder 8 in the conduit and crushed under most circumstances by the action of the heavy screw conveyer, but if not crushed they may be discharged by telescoping the section 5ᵇ of the conduit into the section 5ª to thereby open the conduit and allow the mass of slate or other hard material to drop out. The section 5ᵇ is moved by means of links 9 connected thereto and attached to a lever 10 fulcrumed at 11 and operable from the locomotive cab. The sections 5 and 5ª of the conduit are suitably secured together by tight rods or plates 12 secured rigidly to each section.

The course and the fine fuel are automatically separated as they are carried forward by the conveyer by the following mechanism:—

The conduit section 5ª communicates with a rotatable cylindrical screen member 13 having a plurality of longitudinal slots or openings 14 therein. This cylindrical member is surrounded by a cylindrical sleeve 15 also rotatable and also having longitudinal slots or openings 16 therein similar to the openings in the cylinder 13. The sleeve 15 rotates with the screen member 13 and the slots therein normally register with the slots in the member 13. The sleeve is rotatable, however, relative to the member 13 so that the size of the openings from the interior to the exterior of the conveyer may be varied. For this purpose the cylinder 13 is provided with a cam roller 17 operating in the spiral or inclined cam slot 18 in the sleeve 15. By moving the sleeve longitudinally on the member 13 it rotates with reference to said member and thereby varies the relative positions of the slots in the two members. The sleeve is moved longitudinally by means of a lever 19 fulcrumed at 20 and pivotally connected to a rod 21 which in turn is connected to a member 21ª engaging an annular groove 21ᵇ in one end of the member 15. The lever 19 is held in position by a spring latch 22 which engages a notch in segment 23.

The two members 13 and 15 together form a screen with openings therein which can be varied in size. As the fuel is carried through this screen by the conveyer the fine fuel passes out through the openings and falls into a conduit 25 located beneath the screen. The coarse fuel is carried forward by the conveyer and delivered to elevating mechanism hereinafter described.

The fine fuel conduit 25 contains a screw conveyer formed by a shaft 26 having a spiral vane 27 thereon. This conveyer pushes the fine fuel forward to mechanism which underfeeds it to the fire.

The screw conveyer 27 in the fine fuel conduit 25 is driven by the screw conveyer in the coarse fuel conduit by means of a gear 30 fixed to the shaft 6 of the screw conveyer 7 which gear meshes with a gear 31 on the end of shaft 26 of the conveyer 27. The screen is driven from the screw conveyer 27 by means of a sprocket 32 on shaft 26 which drives a chain passing over a sprocket 34 forming a part of or attached to the section 13 of the screen. The screen rotates upon the cylindrical end 35 of the fixed section 5ª of the conveyer conduit.

The coarse fuel which cannot pass through the slots in the screen is carried forward by the conveyer 7ª to an elevating mechanism which carries it up at the rear of the fire box of the locomotive to fuel injecting mechanism hereinafter described.

Figure 2:
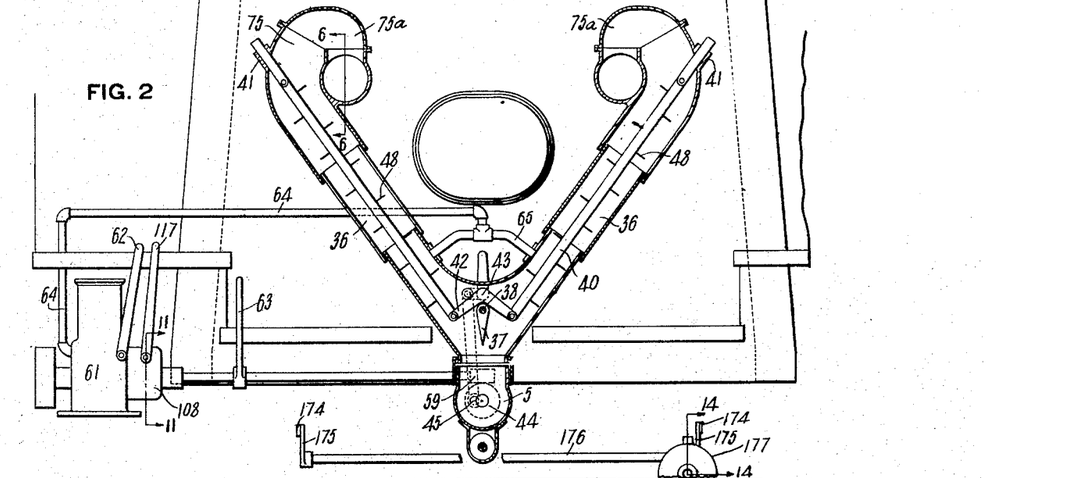
Fig. 2 is a transverse section on the line 2—2, Fig. 1, and showing the driving mechanism and the elevating mechanism for the coarse fuel.

The elevating mechanism is shown in Fig. 2. It comprises a pair of conduits 36 which communicate with and branch from the end of the trough or conduit 5, each of said conduits leading to one of said fuel injecting mechanisms. In the lower ends of the conduits, a central gate or deflector 37 is pivotally mounted upon a transverse rod or shaft 38 provided with a controlling handle 39, so that more or less of the fuel may be deflected into one conduit or the other as desired.

Suitable mechanism is provided for lifting or elevating the fuel in the vertical conduits, comprising rods or bars 40 which at their upper ends slide in a suitable bearing 41 in the casing and are pivotally connected at their lower ends to a double-armed lever 42 fixed upon an oscillating shaft 43. Shaft 43 is oscillated by the same worm gear 44 which drives shaft 6, said worm gear being provided with an eccentric pin 45 having a universal connection to a rod 46, which is suitably coupled to a short arm 47 on shaft 43.

Figures 10, 12, 13:
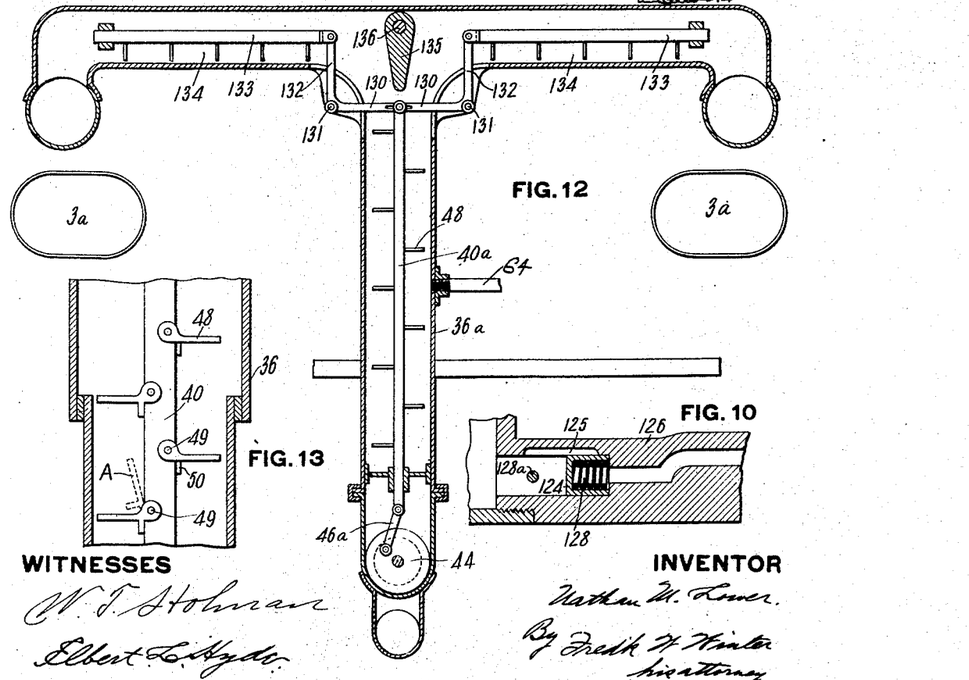
Fig. 10 is an enlarged detail view of a steam valve, corresponding to Fig. 6, and showing the valve in a different position.
Fig. 12 is a detail cross section, corresponding to Fig. 2, and showing elevating mechanism for the coarse fuel adapted for use with a modified arrangement of fire box.
Fig. 13 is an enlarged detail view, corresponding to Fig. 2, of the fuel elevating mechanism.

The bars or rods 40 are provided with a plurality of lifting vanes or paddles 48, of the type shown in Fig. 13, said vanes or paddles being pivotally connected to the bars or rods 40, as at 49, and provided on their under sides with stops or projections 50 to engage the bars 40 and thereby maintain the vanes or paddles in horizontal position as the bars or rods 40 rise under the impulse of their driving or reciprocating mechanism. Whenever the bars or rods 40 move downwardly, however, the vanes or paddles 48 fold into the position A shown in dotted lines Fig. 13, and slide idly downwardly through the fuel. The coarse fuel is fed upwardly step by step in the conduits by the reciprocating bars 40 and is held from sinking or retreating by the pressure of the screw 7. The rods or vanes continually lift the fuel and therefore prevent it from packing in the conduits, which often occurs with wet fuel fed upwardly by a screw conveyer.

Figure 3:
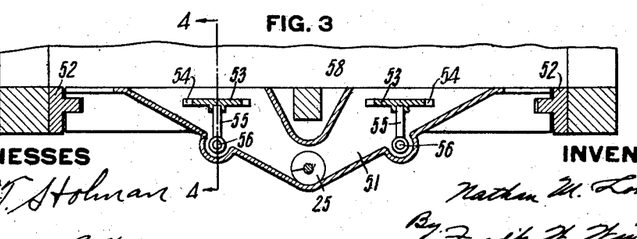
Fig. 3 is a transverse section on the line 3—3, Fig. 1, and showing the conduits for underfeeding the fine fuel.
Figure 6:
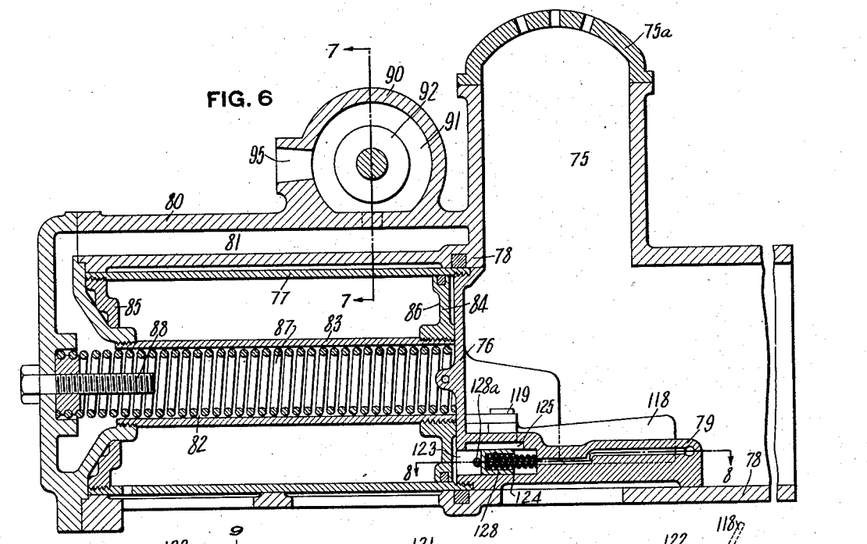
Fig. 6 is an enlarged longitudinal section taken on the line 6—6, Fig. 2, and showing one of the fuel feeding plungers.

The fine fuel which passes through the openings or slots 14, 16 in the rotating screen is fed forwardly by the conveyer 27 to a hollow duplex elbow having a horizontal portion connected to the conduit 25 to receive fuel therefrom and two upwardly extending branch portions 51 which are formed in a member extending transversely of the fire box close to its back wall and supported at its ends upon the side rests 52 of the fire box and which takes the place of one of the usual grate bars. The inner surface of said elbow is free from sharp angles or corners, so that the fine fuel is forced upwardly through the branches 51 by the action and under the pressure of conveyer 27, and is fed through the grate into the fire box at both sides thereof. Preferably, a sliding gate or plate 53 is movably mounted in ways 54 in the sides of each of the conduits 51, said gates or plates being independently controlled by levers 55 on shafts 56, each provided at its outer end with a controlling lever or handle 57. By moving the gates 53 to different positions along their ways, the amount of fine fuel underfed to different portions of the fire box may be varied. For example, referring to Fig. 3, if both of the gates 53 are moved as close to the center grate rest 58 of the fire box as possible, more fuel will be fed along the outer or side walls of the fire box than to its center. With this mechanism it is therefore possible to feed the fine fuel into the back corners of the fire box.

Worm gear 44, on the end of shaft 6, is driven by a worm 59 on the end of a transverse shaft 60 which is rotated by a suitable engine 61. The engine 61 may be of any type or design, but preferably such that its speed can be regulated at will by a lever or other controlling member 62. In the case of a steam engine, which it is preferred to use in the present construction, lever 62 is connected to the governor to control the same in accordance with any of the well known types of variable speed steam engines. 63 represents a suitable ratchet lever connected to shaft 60 for manually rotating the same to move the mechanism off dead center in starting. If the engine 61 is steam driven, its exhaust steam, or a proper proportion thereof or, if desired, live steam from the boiler, or even a jet of water from the tank, is led by suitable pipes or conduits 64 to branch pipes 65 entering the elevator conduits 36 to moisten or dampen the fuel being overfed to the fire box. This engine drives all of the fuel feeding mechanism except the injecting plungers hereinafter referred to, and although it may be operated at varying speeds, the amount of its exhaust steam will always be in proportion to the amount of fuel being fed and therefore will dampen or moisten the same to the same degree under all conditions. Dampening the fuel in the manner stated prevents loss of fine fuel which may have escaped the screen and is fed with the coarse fuel and which, under other circumstances, might be, and often is drawn out unconsumed through the stack by the draft.

Flexibility in the automatic stoker mechanism and between the locomotive and tender is secured in the following manner. At its forward end the conduit or trough 5 is connected to the lower end of the conduits 36 by a collar 66 secured to conduit 5 and having a portion embracing and resting upon a flange 67 on the lower end of conduit 36. Collar 66 is of such dimensions as to permit a proper amount of up and down motion, as well as a swiveling motion of the conduit 5 with respect to conduits 36. The rear end of conduit 5 is provided with a pair of rollers 68 which move in horizontal slots 69 in a frame 70, pivoted at 71 to the bottom of the tender and having a circular projection or flange 72 at its rear end supported by and traveling in a way 73 on the tender frame. Motion of the lower conduit 25 with relation to the locomotive is taken up by a short section 74 of the conduit, which is formed of heavy corrugated metal in such manner as to be sufficiently flexible and yet durable.

Figs. 6 to 10 show in detail the mechanism for forcing or injecting the coarse fuel into the fire box. As shown in Fig. 2 there are two such mechanisms, one on each side of the central plane of the fire box and each supplied with fuel from one of the conduits 36, which are bent or arched over the injecting plungers as at 75 and preferably provided with removable covers or doors 75$^a$ to permit fuel to be introduced by hand to the plungers or access thereto for repairs. The fuel falls from the arched overhanging portions 75 of the delivery conduits 36 in front of the head 76 of a hollow piston 77 which slides in a cylinder 78, said head being provided with a forwardly projecting scoop or shovel 79 traveling in the bottom of cylinder 78 and upon which the fuel is delivered. The casing 80 of the fuel injecting member is provided with a steam supply passage 81 leading into a space 82 within a hollow cylinder or pipe 83 having a circular head or wall 84 at its end and on which the piston 77 travels, steam being admitted to the space 82 behind piston 77, head 76 and scoop 79 are moved forwardly with force and to a distance corresponding to the degree of steam pressure. The follower head 85, on the rear end of the traveling piston 77, fits neatly into an annular space 86 on the rear face of the head 84, forming a cushion stop at the end of the stroke and preventing breakage. Steam being exhausted from passage 81, spring 87, the tension of which may be adjusted by screw 88, returns the head 76 and scoop or shovel 79 to original or normal position.

Figures 7, 11, 14, 15:
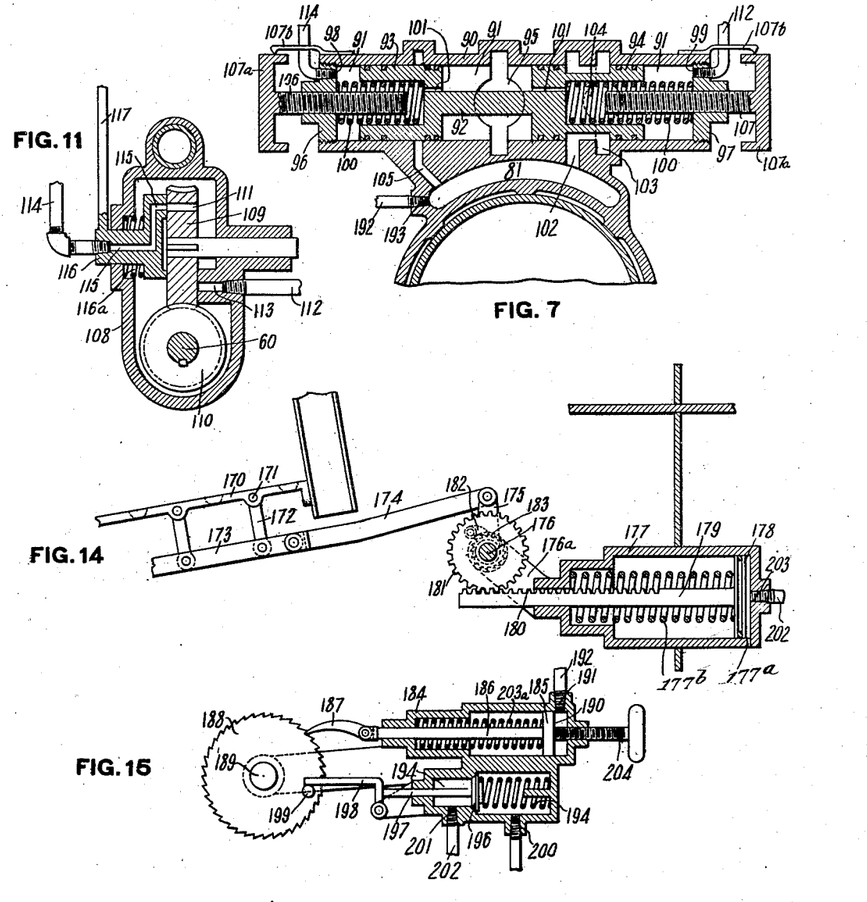
Fig. 7 is a cross section on the line 7—7, Fig. 6.
Fig. 11 is a cross section on the line 11—11, Fig. 2, and showing the regulating valve for controlling the fuel feeding plungers.
Fig. 14 is a sectional elevation on the line 14—14, Fig. 2, and showing the grate and its shaking mechanism.
Fig. 15 is a sectional elevation of valve mechanism for controlling the shaking cylinder.

The force with which the piston 77 and shovel 79 are moved depends upon the steam pressure in the passage 81 or the rate of supply of steam thereto, which supply therefore determines the distance to which the fuel will be thrown by the plunger. On the outside of the casing 80 is a controlling valve shown in detail in Fig. 7 and which comprises a casing 90, continuous with or connected to casing 80 and having a hollow space or chamber 91 therein, in which slides a controlling member or valve 92 having piston heads 93, 94 at its opposite ends. Live steam from the locomotive boiler is supplied to the space 91 through an inlet valve or port 95. The opposite ends of the casing 90 are closed by threaded plugs 96, 97 having exhaust ports 98, 99 therein. Compression springs 100 are mounted between the plugs 96, 97 and the opposite piston heads 93, 94, the tension of said springs being such that the controlling member 92 is normally held in central position in the chamber, as shown in Fig. 7, in which position said springs have no initial tension. Leak ports or passages 101 through the opposite piston heads 93, 94, permit boiler pressure to normally obtain in all parts of the interior chamber 91. Whenever steam is vented from either of the ports 98 or 99 the valve 92 moves toward that end of the casing. Assume that pressure is vented from port 98. In such case valve 92 moves to the left in Fig. 7. This cuts off the exhaust through port 102, passage 103 and exhaust port 104, and opens up port 105 to admit steam from the boiler to the supply passage 81, thereby forcing the piston 77 forwardly. When the venting of port 98 to the atmosphere is cut off, as will be hereinafter described, pressure leaks through port 101 to the rear side of the piston head 93, which then returns the valve to central position and opens up the passage 102 to the exhaust port 104 and permits the piston 77 to return to initial position under the influence of spring 87. If port 99 is vented the piston moves in the opposite direction, or to the right in Fig. 7, and pressure is admitted from the boiler to the supply passage 81 through the port 102. As will be observed port 105 is considerably smaller than port 102, so that steam enters more quickly when port 102 is open than when port 105 is open, thereby moving the plunger faster and with more force. Port 99 is vented when it is desired to place fuel ahead or at the front of the fire box and port 98 when it is desired to merely drop it at the back of the fire box near the firing doors. 106 and 107 represent set screws threaded into the plugs 96 and 97 and arranged to form stops which limit the amount of endwise movement of the valve 92 in both directions and therefore the amount of opening of ports 105 and 102. By properly adjusting the set screws 106 and 107 the fuel may be thrown into the fire box with as much or as little force as desired and therefore may be distributed according to circumstances. The screws 106 and 107 may be provided with graduated heads 107$^a$ to coöperate with pointers 107$^b$ to indicate the positions of the screws.

The periodic venting of ports 98 and 99 is controlled by the valve illustrated in Fig. 11, which comprises a casing 108 surrounding shafts 60 and having a worm wheel 109 rotatable therein and driven by a worm 110 on shaft 60, said worm wheel having a port or passage 111 therethrough which controls the venting of ports 98 and 99. Port 99 is connected by a pipe 112 to a port or passage 113 through an internal boss in the casing 108, which boss at its inner end contacts one face of the worm wheel 109. Port 98 is connected by a pipe 114 to a passage 115 through member 116 rotatably adjustable around the axis of rotation of worm wheel 109 and controlled by a handle lever 117. Member 116 is yieldingly pressed against the opposite side of the worm wheel 109 from the boss containing port 113 by a spring 116$^a$. The arrangement is such that as the worm wheel 109 rotates on its axis port 111 therein is brought alternately into registration with ports 113 and 115, thereby alternately venting ports 99 and 98 to the atmosphere once during each revolution of the worm wheel 109. The periods of time between the respective ventings of ports 99 and 98 may be varied by adjusting member 116. This allows more or less fuel to accumulate in front of the plungers before either the heavy or light strokes thereof.

Figures 8, 9:
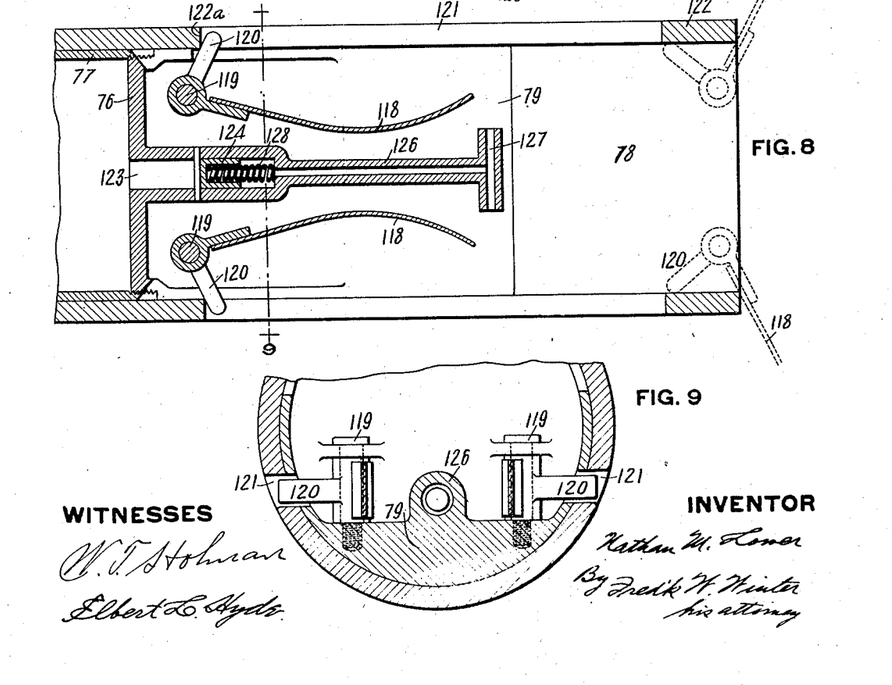
Fig. 8 is a horizontal section on the line 8—8, Fig. 6.
Fig. 9 is a transverse section on the line 9—9, Fig. 8.

To assist in distributing the coarse fuel laterally over the fire bed the scoop or shovel 79 is provided with a pair of wings or vanes 118 pivotally mounted upon vertical axes 119 at opposite sides of the piston or plunger and having short arms 120 connected thereto, the ends of said arms traveling in grooves or slots 121 in the wall of the casing 78 and arranged to engage stops or abutments 122 at the forward ends of the casing, to thereby open the arms or vanes 118 laterally and throw the fuel to the extreme side sheets of the fire box. On the return movement of the plunger the vanes 118 contact with the forward portions of abutments 122 and the arms 120 also contact with shoulders 122$^a$, to return the vanes to normal position. In some cases it may also be advisable to use a steam jet for assisting in distributing the fuel laterally, although such arrangement is not essential. In the form shown the head 76 of the piston is provided with a passage 123 in which moves a valve 124 controlling a side passage 125 in the wall of a pipe or tube 126 extending to the front of the scoop or shovel 79 and having lateral branches 127 arranged to deliver two jets of steam in opposite directions. When the port 98 is vented and the plunger receives a light impulse, steam is also admitted past the valve 124 through side passage 125 to the pipe 126 and is discharged laterally through the branches 127 to blow the fuel laterally in the fire box. When, however, the plunger receives a heavy impulse, under plenty of steam pressure, the valve 124 is forced forwardly against the action of its spring 128, as shown in dotted lines, Fig. 10, and thereby cuts off port 125 and the admission of steam to the branches 127. The steam is therefore effective only on light strokes of the piston and is valuable in distributing the fuel to the back corners of the fire box. 128$^a$ represents a suitable stop to limit rearward movement of the valve.

Fig. 12 shows a modified form of the invention arranged for feeding the coarse fuel to a fire box provided with two fire doors 3$^a$ on either side of its central plane. A single vertical elevator conduit 36$^a$ extends up the front wall of the fire box between the fire doors and is provided on its interior with a reciprocating rod or bar 40$^a$ having pivoted vanes or wings 48 thereon which lift the fuel by a step by step movement. The rod or bar 40$^a$ is reciprocated by a link member 46$^a$ connected to operating worm gear 44, as in the form of stoker heretofore described. At its upper end the rod or bar 40$^a$ is provided with a pivot engaging lengthwise slots in the arms 130 of a pair of bell crank levers pivoted at 131 and having their opposite arms 132 pivotally connected to rods or bars 133 which reciprocate in the two horizontal branches 134 of conduit through which the fuel is fed to the oppositely disposed injecting plungers. Preferably, a manually controlled vane or deflector 135 is mounted upon a rotatable shaft 136 above the conduit 36$^a$ and the said vane or gate is adapted to be placed in different positions to deflect more or less of the fuel to one side or the other as desired.

Figure 16:
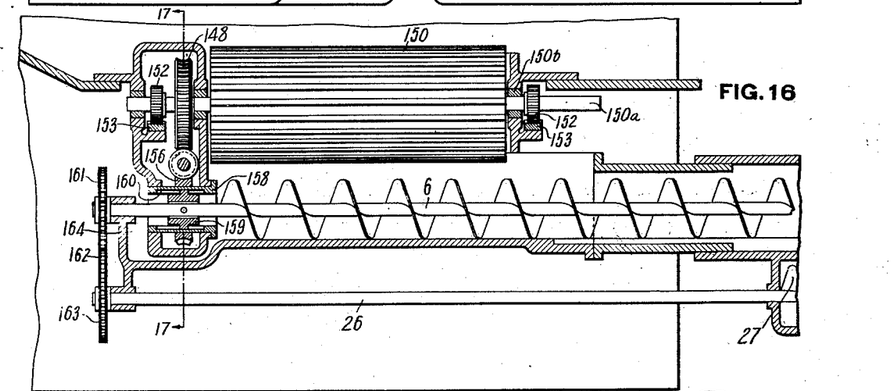
Fig. 16 is a longitudinal section corresponding to Fig. 1 and showing the stoker mechanism with a fuel crusher connected thereto.
Figure 17:
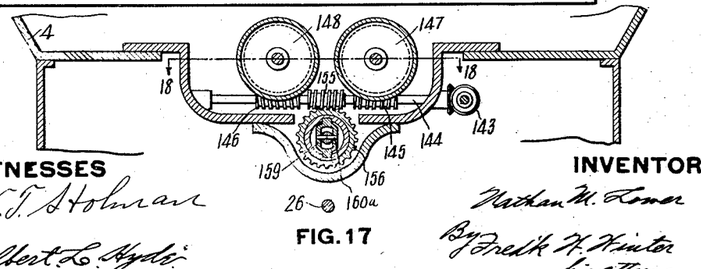
Fig. 17 is a transverse section on the line 17—17, Fig. 16.
Figure 18:
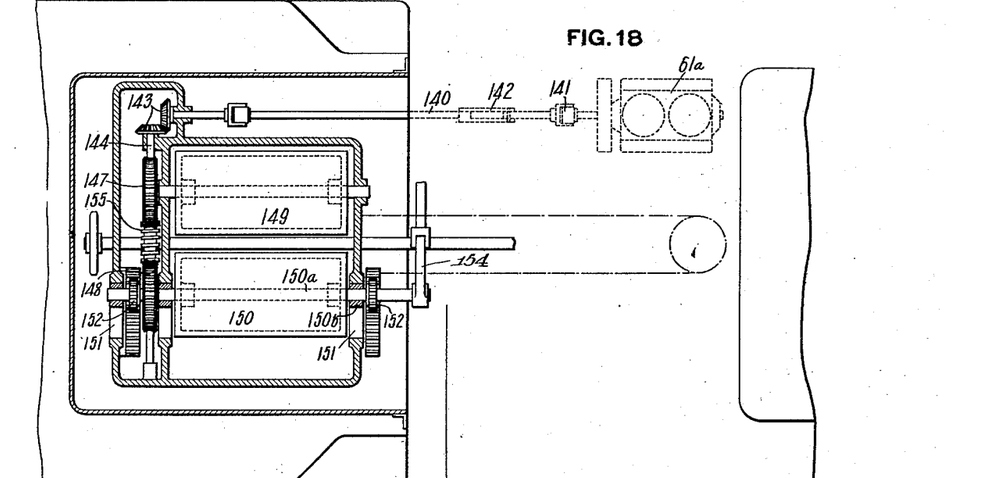
Fig. 18 is a horizontal section on the line 18—18, Fig. 17.

Figs. 16, 17 and 18 illustrate my improved stoker mechanism equipped with crushing mechanism for reducing the fuel to the proper size to secure the greatest economy in consumption. As shown, the variable speed engine 61$^a$ rotates a shaft 140 through universal joints 141 and telescoping connection 142, to permit relative movement between the tender and locomotive. Said shaft 140 is connected by bevel gears 143 to a transverse shaft 144 having a pair of worms 145, 146 thereon, said worms being connected to drive worm gears 147. 148 on the shafts of a pair of crushing rollers 149 and 150, said rollers being mounted in the bottom of the tender and arranged to receive the fuel therein by gravity. The threads on the worms 145, 146 run in opposite directions so that the crushing rollers turn toward each other and the crushing rollers are provided on their cylindrical outer surfaces with teeth or ribs to enable them to grasp and crush the larger masses or lumps of fuel. Preferably, one of the crushing rollers is adjustably mounted to be movable toward and from the other roller so that whenever an abnormal lump or mass of fuel or foreign matter is encountered, the rolls can be separated to permit the same to pass therebetween. As indicated the crushing roller 150 has a shaft or axis 150$^a$, the ends of which are mounted in square bearing members 150$^b$ which slide in horizontal slots 151 in the frame, and said shaft is provided with pinions 152 meshing with fixed racks 153 therebeneath. A lever 154 is suitably connected to the shaft 150$^a$ so that it may be rotated to cause the pinions 152 to roll along the racks 153, and worm gear 148 to roll on worm 146, and the bearing members 150$^b$ to slide in their slots to thereby separate the crushing rollers from each other horizontally. Shaft 144 also carries a worm 155 meshing with a worm gear 156, connected by a gimbal joint to shaft 6, which extends therethrough, said gimbal joint permitting relative movement between the tender and locomotive both laterally and longitudinally. Said joint comprises a hollow shaft 158 fixed rigidly to the worm gear 156 and rotating a sleeve-like yoke 159 having external pins projecting into and sliding in slots or grooves 160 in said shaft, and having a transverse pin 160$^a$ for connecting said yoke to the shaft 6. Shaft 6, at its rearward end, is provided with a sprocket 161 over which passes a chain 162 connected to a sprocket 163 to drive shaft 26 upon which is mounted the lower spiral conveyer 27.

In this form of the invention shaft 6 is driven from its rear end, instead of from its front end, as in the other form described. If abnormally large masses of fuel or foreign matter are encountered by the crushing rolls, they are separated as described, to allow the mass to pass therebetween and be discharged from the conveying conduit by operation of the telescoping section 5ᵇ thereof, as before described. The crushing rolls are mounted rigidly in the tender. Trough 5, as before stated, is pivotally connected at its front end to the lower end of the upwardly extending elevator conduit and swings freely in any direction. The weight of the trough is carried by the shaft 6, said trough being provided at its rear end with a hanger 164, forming a bearing member in which shaft 6 rotates.

Under some circumstances it is desirable to automatically shake the grate in the bottom of the fire box, to break up clinkers which might form thereon if the fire were left too long undisturbed. This arrangement, however, is not essential and may be omitted if desired. The grate and the shaking mechanism therefor are shown in Figs. 2, 14 and 15 and comprises a plurality of bars or grate members 170, each of which is mounted to oscillate on trunnions 171 working in bearing apertures in the side grate rests. Said grate members are provided with downwardly extending arms 172 all of which are connected to a bar 173 which is reciprocated by a link 174 pivotally connected thereto and to an arm 175 rigidly connected, as by keying, to a shaft 176. Said shaft rotates in bearing arms 176ᵃ on a casing 177 which is hollowed out to form a cylinder in which operates a piston 178 whose rod 179 is provided at its forward end with teeth 180 meshing with the teeth of a pinion 181. Said pinion rotates loosely upon shaft 176 and is provided with a pawl or dog 182 to engage the teeth of a ratchet 183 keyed upon shaft 176. At each reciprocation of the piston 179 the rack 180 is moved longitudinally to an extent sufficient to rotate the shaft 176 through one complete revolution, thereby giving all of the grate members a single shaking movement.

Pressure is admitted to cylinder 178 by the control valve shown in Fig. 15 and which may be mounted upon any convenient portion of the fixed frame of the locomotive. The control valve comprises a casing 184 in whose chamber slides a piston 185 having a piston rod 186 projecting through one end of the casing and provided with a pawl or dog 187 engaging the teeth of a ratchet wheel 188 rotatable on shaft 189. Pressure is admitted to the chamber 190 in which said piston slides through a port 191 connected by a pipe 192 to port 193 (Fig. 7), through which steam is admitted from the passage 81 for supplying steam to the fuel injecting plungers whenever the same is actuated. Casing 184 is also formed to provide a chamber 194 which is reduced to form a valve seat for a valve 196, said valve having a valve rod 197 projecting through the end of the casing and at its end engaged by a pivoted lever 198 arranged to be contacted by a pin or projection 199 on the ratchet 188. Casing 184 is provided with a port 200 which is connected by a suitable pipe or conduit to furnish a supply of boiler steam. A second port 201, connected to the reduced portion of the chamber 194 is connected by a conduit 202 leading to port 203 in the shaker operating cylinder 177.

Whenever steam pressure is admitted to supply passage 81 to operate the fuel injector plunger pressure is also admitted through conduit 192 to cylinder 184 thereby moving piston 185 against the influence of its spring 203ᵃ and causing the pawl 187 to rotate ratchet 188. The amount of rotation of ratchet 188 may be controlled or regulated by a set screw 204 in the end of the casing 184 which limits the movement of the piston 185. At each complete rotation of ratchet wheel 188 lever 198 is operated by pin 199 to open valve 196 and admit boiler pressure from port 200 to the chamber 194 and through conduit 202 to cylinder 177, thereby forcing the piston 178 forward and rotating pinion 181 and shaft 176 to thereby operate the link 174 and the several grate members. The regulating screw 204 controls the periodicity of shaking of the grates. After pressure has been admitted to suddenly expand in the casing 177 and move piston 178, it gradually exhausts through the leak port 177ᵃ, the spring 177ᵇ then returning the piston to initial position for the next operation.

The stoker mechanism described has the following advantages: In the usual types of mechanism, where all of the fuel is fed to the fire box through the grate it is found in practice that the fire gradually cakes or fuses over and forms large masses of clinker which interfere greatly with combustion and render periodic thorough cleaning of the fire box necessary. Where the fuel is wholly overfed, that is, thrown or dropped upon the surface of the fire, as distinguished from underfeeding or feeding through the grate, the draft through the fire box is so great that a large proportion of the fine fragments of fuel is drawn out through the stack unconsumed, with a consequent loss of efficiency. With my improved mechanism the fuel is both overfed and underfed. Preferably, the fuel is assorted before feeding, as by the means shown, the coarser fuel being delivered over and the finer fuel through the bed of fuel on the grate. The coarse fuel is fed to the top surface of the fire, in a dampened condition, thereby avoiding the discharge of unconsumed fuel from the stack. By feeding the fuel in this manner caking and crusting of the fire bed is avoided and the formation of clinker is decreased to a large extent. The mechanism is arranged so that both the fine and coarse fuel supplies may be distributed to different points in the fire box to equalize the consumption of fuel therein and secure an even and level bed of fire to produce the maximum number of heat units. The fine fuel is fed to the fire box close to the fire door and the plungers for introducing or injecting the coarse fuel into the fire box are so arranged as to give alternate light and heavy impulses to the fuel and thereby distribute the same over the fire bed, the heavy strokes forcing or throwing the fuel clear to the front of the bed and the light strokes dropping it in front of the doors. The movable vanes on the plunger shovel and the lateral steam jets also assist in scattering the fuel laterally over the fire bed to thereby supply fuel to the back corners thereof. Moreover, the plurality of plungers gives a good distribution of fuel, even over very wide fire boxes in the largest locomotives. The grate shaking mechanism is used to a large extent with certain types of fuels which are liable to cake or form clinker and assist greatly in breaking up such masses as may form and thereby promote combustion. The crushing rolls are not intended to reduce all of the fuel to small size, but merely to take care of such large lumps or masses as would not readily pass through the conveying mechanism. Usually, crushed fuel will be supplied to the tender, although run of mine or varying proportions and sizes of fine and coarse fragments may be used, if desired. As before stated, the crushing rolls may be operated to permit the passage of abnormally large masses which might damage the rolls and which can be then discharged from the conveying system by the operation of the telescoping section of the conveyer conduit. The entire mechanism, with the exception of the injecting plungers, is driven by a single variable speed engine, thereby permitting the rate of feed of fuel to all portions of the fire box to be readily controlled by the operation of a single controlling lever.

No claim is made herein to the construction of the fuel injecting plunger or of the valvular mechanism for controlling the same, such subject matter being claimed in my copending divisional applications, Serial No. 46,335, filed August 19, 1915, and Serial No. 46,336, filed August 19, 1915.

It is to be understood that the structure shown is for purposes of illustration and that other structures may be devised which come within the spirit and scope of the appended claims.

What I claim is:—

1. Stoker mechanism comprising in combination, fuel separating mechanism, means for underfeeding the fine fuel to the fire box, and means for delivering the coarse fuel from the separating mechanism to the fire.

2. Stoker mechanism comprising in combination, adjustable means arranged to separate the fuel into varying proportions of fine and coarse fragments, means for underfeeding the fine fuel to the fire box, and means for delivering the coarse fuel to the upper surface of the fire therein.

3. Stoker mechanism comprising in combination, adjustable means arranged to separate the fuel into varying proportions of fine and coarse fragments, means for underfeeding the fine fuel to the fire box, means for delivering the coarse fuel to the upper surface of the fire therein, and adjustable means for varying the amounts of fine fuel fed to different portions of the fire box.

4. Stoker mechanism comprising in combination, adjustable means arranged to separate the fuel into varying proportions of fine and coarse fragments, means for underfeeding the fine fuel to the fire box, and adjustable means for varying the amounts of coarse fuel fed to different portions of the fire box.

5. Stoker mechanism comprising, in combination, a fire box, a fuel screen, means for varying the mesh of the screen, means for underfeeding fine fuel from the screen into the fire box, and means for overfeeding the coarser fuel passing over the screen into the fire box.

6. Stoker mechanism comprising, in combination, a fuel bin, a fire box, a conduit leading from the bin for overfeeding fuel into the fire box, a section of said conduit being a screen, and a conduit receiving from the screen and underfeeding fuel into the fire box.

7. Stoker mechanism comprising, in combination, a fuel bin, a fire box, a conduit leading from the bin for overfeeding fuel into the fire box, a section of said conduit being a screen, means for varying the mesh of said screen, and a conduit receiving from the screen and underfeeding fuel into the fire box.

8. Stoker mechanism comprising, in combination, a fire box, a fuel screen, means for varying the mesh of said screen, means for underfeeding the fine fuel from said screen into the fire box, adjustable means for varying the amounts of fine fuel fed to different portions of the fire box, and means for overfeeding the coarser fuel passing over the screen into the fire box.

9. Stoker mechanism comprising, in combination, a fire box, a fuel screen, means for varying the mesh of said screen, means for underfeeding fine fuel from said screen into said fire box, means for overfeeding the coarser fuel passing over said screen into the fire box, and adjustable means for varying the amounts of coarse fuel fed to different portions of the fire box.

10. Stoker mechanism comprising in combination, fuel separating mechanism, a conveyer for underfeeding into the fire box the fine fuel separated by said mechanism, and means for elevating the coarse fuel and arranged to discharge the same into the fire box above the level of the fire therein.

11. Stoker mechanism comprising in combination, fuel separating mechanism, a conveyer for underfeeding into the fire box the fine fuel separated by said mechanism, means for elevating the coarse fuel and arranged to discharge the same into the fire box above the level of the fire therein, and connected mechanism for operating said conveyer and elevating means.

12. Stoker mechanism comprising in combination, fuel separating mechanism, a conveyer for underfeeding into the fire box the fine fuel separated by said mechanism, a conveyer for lifting the coarse fuel and arranged to deliver the same into the fire box above the level of the fire bed therein, connected mechanism for operating said conveyers, a variable speed steam engine for operating said mechanism, and means for conducting exhaust steam from said engine to one of said conveyers to dampen the fuel therein.

13. Locomotive stoker mechanism, comprising a fire box, a tender, a conduit for receiving fuel from said tender, a separator connected to said conduit, a second conduit arranged to receive fine fuel from said first named conduit and underfeed the same to the fire box, and a conduit leading from said separator to the fire box for feeding the coarse fuel thereinto above the level of the fire.

14. Locomotive stoker mechanism, comprising a fire box, a tender, a separating screen having openings therein and arranged to receive fuel from said tender, means for adjusting the sizes of the openings in said screen to thereby separate different amounts of fuel, a conduit for receiving fine fuel from said screen and arranged to underfeed the same to the fire box, and means for transferring the coarse fuel to the fire box and delivering it to the surface of the fire therein.

15. Locomotive stoker mechanism comprising a fire box, a tender, crushing mechanism in said tender, a separating screen arranged to receive fuel from said crushing mechanism, and means for delivering the fuel from said screen to said fire box and underfeeding the fine fuel and overfeeding the coarse fuel thereinto.

16. Locomotive stoker mechanism comprising a fire box, a tender, crushing mechanism in said tender, fuel separating mechanism arranged to receive fuel from said crushing mechanism, a conveyer for transferring the fine fuel from said separating mechanism to said fire box and underfeeding the same thereinto, a conveyer for transferring the coarse fuel from said separating mechanism to said fire box and overfeeding the same thereinto, and common means for operating said conveyers and separating mechanism.

17. Locomotive stoker mechansm, comprising a fire box, a tender, movably mounted crushing rolls adapted to be separated from each other to permit abnormal masses to pass therebetween, manually operable means for moving said rolls relatively to each other, and a conduit for conducting fuel to the fire box, said conduit embodying means for discharging abnormal masses therefrom.

18. Locomotive stoker mechanism comprising a fire box, a tender, crushing rolls in said tender arranged to be separated from each other to permit abnormal masses to pass, a conduit for conducting fuel from said crushing rolls to said fire box, said conduit embodying a telescoping section, and means for moving said conduit section to discharge abnormal masses therefrom.

19. Locomotive stoker mechanism comprising a fire box, a tender, a conduit for receiving fuel from said tender, a hollow separating screen open at both ends, a conveyer extending through said conduit and screen, means communicating with the open end of said screen for conducting coarse fuel therefrom and delivering the same into the fire box, a trough beneath said screen for receiving fine fuel therefrom, and means for conveying fuel through said trough and underfeeding the same into said fire box.

20. Locomotive stoker mechanism comprising a fire box, a tender, a conduit for receiving fuel from said tender, a hollow rotatable separating screen, a conveyer extending through said conduit and screen, means communicating with said screen for conducting coarse fuel therefrom and delivering the same to said fire box, a trough beneath said screen for receiving fine fuel therefrom, a conveyer in said trough for conveying fuel therefrom and into said fire box, means for driving said conveyers, and means connected to said second conveyer for rotating said screen.

21. Locomotive stoker mechanism, comprising a fire box, a tender, a conduit for receiving fuel from said tender, a rotatable separating screen, a vertical conduit communicating with said screen, means in said vertical conduit for lifting the fuel therein, and means for rotating said rotatable screen and for operating said fuel lifting means.

22. Locomotive stoker mechanism comprising a fire box, a tender, a hollow rotatable screen arranged to receive fuel from said tender, a spiral conveyer in said screen for moving the fuel therethrough, a conduit beneath said screen and arranged to receive fine fuel separated thereby, a spiral conveyer in said conduit, a vertical conduit communicating with said screen, means in said vertical conduit for lifting the coarse fuel therein, and common means for rotating said spiral conveyers and operating said lifting means.

23. Stoker mechanism comprising in combination, fuel separating mechanism, means for receiving the fine fuel from the separating mechanism and underfeeding it to the fire box, and means for feeding the coarse fuel to the fire box above the level of the fire therein.

24. Stoker mechanism comprising in combination, fuel separating mechanism, means for conveying the fine fuel from said mechanism to the fire box and underfeeding it thereinto, and means for conveying the coarse fuel from said mechanism and feeding it to the surface of the fire.

25. Stoker mechanism comprising in combination, a fire box, power mechanism for underfeeding fuel to said fire box, and separate power mechanism coöperating with said first named mechanism for simultaneously feeding fuel into said fire box above the level of the fire therein.

26. Stoker mechanism comprising in combination, a fire box, means for underfeeding fuel to said fire box, means for overfeeding fuel to said fire box above the level of the fire therein, means for supplying fine fuel to said underfeeding means, and means for supplying coarse fuel to said overfeeding means.

27. Stoker mechanism, comprising in combination, a fire box, mechanism for underfeeding fuel to said fire box, separate mechanism for simultaneously overfeeding fuel to the fire in said box, and power mechanism for actuating both of said feeding devices in timed relation with each other.

28. Stoker mechanism, comprising in combination, a fire box, means for underfeeding fuel thereto, means for overfeeding fuel into the fire box above the level of the fire therein, means for supplying fine fuel to the underfeeding means, means for supplying coarse fuel to the overfeeding means, and means for actuating said underfeeding and overfeeding means in timed relation with each other.

29. In combination, a locomotive having a fire box, a tender having a fuel bin, two conduits leading from the bin below the floor thereof, one of such conduits entering the fire box above the grate thereof and the other entering the fire box through such grate, and means for forcing fuel through such conduits.

30. Locomotive stoker mechanism, comprising in combination, fuel separating mechanism arranged to be located beneath the deck of a locomotive tender, means for feeding the coarse fuel into the locomotive fire box, and separate power actuated means for also feeding the fine fuel thereinto.

31. In combination, a locomotive having a fire box, a tender having a fuel bin, a screen located below the tender deck and receiving from the bin, power actuated transfer mechanism delivering from the upper face of the screen to the fire box, and power actuated transfer mechanism delivering from below the screen to the fire box.

32. Locomotive stoker mechanism comprising, in combination, a fire box, a bin, power mechanism for transferring fuel from the bin to said fire box, a motor for operating said transfer mechanism, and means controlled by said motor for moistening the fuel.

33. Locomotive stoker mechanism comprising, in combination, a fire box, a fuel bin, variable speed mechanism for transferring fuel from said bin to said fire box, and means regulated by the action of the variable speed transfer mechanism for moistening the fuel.

34. In an underfeed stoker, in combination, a grate, a conduit entering therethrough, means for forcing fuel through said conduit and underneath the fire on said grate, and deflecting means for distributing the fuel discharged through said conduit to vary the amount of fuel supplied to different parts of the grate to thereby trim the fire.

35. In an underfeed stoker, in combination, a grate, a conduit entering therethrough, means for forcing fuel through said conduit underneath the bed of fire on said grate, and a shiftable gate in the throat of said conduit for distributing the fuel discharged therethrough to vary the amount of fuel supplied to different parts of the grate to thereby trim the fire.

36. In an underfeed stoker, in combination, a grate, a conduit entering therethrough, and a slidable plate of less area than the throat of the conduit and located transversely within the same, whereby the fuel delivered by the conduit may be variably distributed.

37. A locomotive stoker, comprising a horizontal transfer conduit, a plurality of upwardly extending conduits for receiving the fuel from said transfer conduit and provided with means for elevating the fuel to a position above the level of the fire, a deflector for controlling the relative supplies of fuel to said upwardly extending conduits, and a plurality of devices connected to said upwardly extending conduits for delivering the fuel to the fire box.

38. A locomotive stoker, comprising a fire box, a horizontal transfer conduit, means for elevating the fuel from said conduit to a point above the level of the fire and distributing it to a plurality of points laterally thereover, means for varying the amounts of fuel supplied to different points laterally over the fire, and a plurality of devices connected to said distributing means for delivering the fuel to the fire box.

39. A locomotive stoker, comprising a fire box, a horizontal transfer conduit, means for elevating the fuel from said conduit to a point above the level of the fire and including a plurality of conduits extending to different positions laterally above the fire, a deflector for controlling the relative amounts of fuel supplied to said lateral points, and a plurality of devices connected to said conduits for delivering the fuel to the fire box.

40. In a locomotive stoker, in combination, a grate, a horizontal conduit located beneath the level of the grate, said conduit having two upwardly extending branches opening into opposite sides of the fire box through said grate, mechanism for forcing fuel under pressure through said conduit and said branches underneath the bed of fire on said grate, and means in each of said branches for distributing the fuel discharged therethrough to vary the amount of fuel supplied to different parts of the grate to thereby trim the fire.

41. In combination, a locomotive having a fire box, a tender having a fuel bin, a continuous conduit leading forwardly from below the fuel bin upwardly through the firing floor of the locomotive and into the fire box, a supplemental conduit below the first-named conduit and delivering through the grate of the fire box, a screen in the wall of the first-named conduit delivering to the supplemental conduits, and conveying means within both conduits.

42. In combination, a locomotive having a fire box, a tender having a fuel bin, a continuous conduit leading from below the tender floor and delivering to the fire box above the bed of burning fuel, a section of such conduit comprising a revoluble screen, a conduit receiving from the screen and delivering through the grate of the fire box, and means for turning the screen section.

43. In combination, a locomotive having a fire box, a tender having a fuel bin, a conduit leading from the tender to the fire box, a section of the wall of such conduit being foraminous, a foraminous sleeve including such section, a conduit receiving from such foraminous section and leading to the fire box below the level of the fire therein, and means for advancing fuel through such conduits and for rotating the sleeve.

44. In combination, a locomotive having a fire box, a tender having a fuel bin, a conduit leading forwardly from below the fuel bin upwardly through the firing floor of the locomotive and into the fire box, a supplemental conduit below the first-named conduit and delivering through the grate of the fire box, a screen in the wall of the first-named conduit delivering to the supplemental conduit, and a spiral conveyer within each conduit.

45. In combination, a locomotive having a fire box, a tender having a fuel bin, a conduit leading forwardly from below the fuel bin upwardly through the firing floor of the locomotive and into the fire box, a supplemental conduit below the first-named conduit and delivering through the grate of the fire box, a screen in the wall of the first-named conduit delivering to the supplemental conduit, and conveying means within both conduits.

46. In combination, a locomotive having a fire box, a tender having a fuel bin, a conduit leading from below the tender floor and delivering to the fire box above the bed of burning fuel, a section of such conduit comprising a revoluble screen, a conduit receiving from the screen and delivering through the grate of the fire box, and means for turning the screen section.

47. In combination, a locomotive having a fire box, a tender having a fuel bin, a conduit leading from the tender to the fire box, a section of the wall of such conduit being foraminous, a foraminous sleeve inclosing such section, a conduit receiving from such foraminous section and leading to the fire box below the level of the fire therein, and means for advancing fuel through such conduits and for rotating the sleeve.

48. In combination a locomotive having a fire box, a tender having a fuel bin, a conduit leading forwardly from below the fuel bin upwardly through the firing floor of the locomotive and into the fire box, a supplemental conduit below the first-named conduit and delivering through the grate of the fire box, a screen in the wall of the first-named conduit delivering to the supplemental conduit, and a spiral conveyer within each conduit.

49. In a stoker mechanism, in combination, a horizontal transfer conduit, means for elevating the fuel from said conduit to a point above the level of the fire and distributing the same to a plurality of points laterally thereover, and means for varying the amounts of fuel distributed to different portions of the fire.

50. In stoker mechanism, in combination, a horizontal transfer conduit, means for elevating fuel from said conduit to a point above the level of the fire and distributing it to a plurality of points laterally thereover, and a deflector for controlling the relative amounts of fuel supplied to said respective points.

51. In stoker mechanism, in combination, a transfer conduit arranged to elevate the fuel to a point above the level of the fire and distribute it to a plurality of points laterally thereover, and a deflector in said conduit for controlling the relative amounts of fuel supplied to said respective points.

52. In stoker mechanism, in combination, a transfer conduit having means for elevating the fuel to a point above the level of the fire and having laterally extending branches for distributing the fuel to a plurality of points laterally over the fire, and a deflector for varying the relative amounts of fuel supplied to said lateral branches respectively.

53. In stoker mechanism, in combination, a horizontal transfer conduit, a plurality of upwardly extending conduits receiving the fuel from said horizontal conduit and provided with means for elevating the fuel to a point above the level of the fire, and a deflector for controlling the relative amounts of fuel supplied to said upwardly extending conduits.

54. In stoker mechanism, in combination, a locomotive fire box, means for feeding fuel into said fire box, and transfer and elevating mechanism for supplying fuel to said fuel feeding means, said mechanism comprising a horizontal conveyer, a pair of upstanding conduits receiving from said conveyer, elevating mechanism within said conduits, and an adjustable deflector plate at the juncture of the conduits.

55. In locomotive stoker mechanism, in combination, a single horizontal transfer conduit for transferring fuel from the tender forwardly to the locomotive, and a plurality of upwardly extending conduits receiving the fuel from said horizontal conduit, and means arranged to elevate the fuel above the level of the fire and deliver it to a plurality of points transversely of the fire.

In testimony whereof, I have hereunto set my hand.

NATHAN MARPLE LOWER.

Witnesses:
CORNELIA C. CHATFIELD,
ELSIE M. SMITH.